United States Patent [19]
Nakagawa et al.

[11] Patent Number: 5,745,483
[45] Date of Patent: Apr. 28, 1998

[54] WIRELESS COMPUTER NETWORK COMMUNICATION SYSTEM AND METHOD HAVING AT LEAST TWO GROUPS OF WIRELESS TERMINALS

[75] Inventors: Yoshikatsu Nakagawa, Yamato; Masamitsu Suzuki; Satoshi Takahashi, both of Yokohama; Harumi Kokaji, Hino, all of Japan

[73] Assignee: Ricoh Company, Ltd., Tokyo, Japan

[21] Appl. No.: 536,248

[22] Filed: Sep. 29, 1995

[30] Foreign Application Priority Data

Sep. 29, 1994 [JP] Japan .................................. 6-234631

[51] Int. Cl.⁶ .................................................. H04B 7/204
[52] U.S. Cl. ........................ 370/335; 370/344; 370/445; 455/34.2
[58] Field of Search ..................... 370/95.1, 95.3, 370/85.2, 85.3, 18, 319, 340, 320, 321, 330, 335, 336, 337, 338, 342, 343, 441, 445, 447, 344; 375/200, 205; 455/34.1, 34.2, 62, 54.1, 54.2, 63

[56] References Cited

U.S. PATENT DOCUMENTS

| | | | |
|---|---|---|---|
| 4,741,049 | 4/1988 | De Jager et al. | 455/34.2 |
| 4,965,849 | 10/1990 | Kunihiro | 455/34.2 |
| 5,101,503 | 3/1992 | Furuya | 455/34.2 |
| 5,394,391 | 2/1995 | Chen et al. | 370/85.3 |
| 5,471,469 | 11/1995 | Flammer et al. | 370/95.3 |
| 5,483,666 | 1/1996 | Yamada et al. | 455/34.1 |
| 5,497,505 | 3/1996 | Koohgoli et al. | 455/63 |
| 5,502,724 | 3/1996 | Chen et al. | 370/95.1 |

*Primary Examiner*—Chau Nguyen
*Attorney, Agent, or Firm*—Oblon, Spivak, McClelland, Maier & Neustadt, P.C.

[57] ABSTRACT

A wireless computer network communication system for use in an environment in which plural groups can perform network communication at the same time. A channel controller receives a requirement of starting network communication from a computer, controls a wireless channel sensor, and detects a received signal. The wireless channel detector detects which wireless channel is employed by one or more other networks and the channel controller determines the wireless channel to be employed by its own group and also controls the transceiver. The computer starts the network communication through a network controller. The network controller controls the transceiver for transmitting and receiving data by use of the wireless channel, and the same further controls the transmitting/receiving of the requirements and the data from the computer.

15 Claims, 10 Drawing Sheets

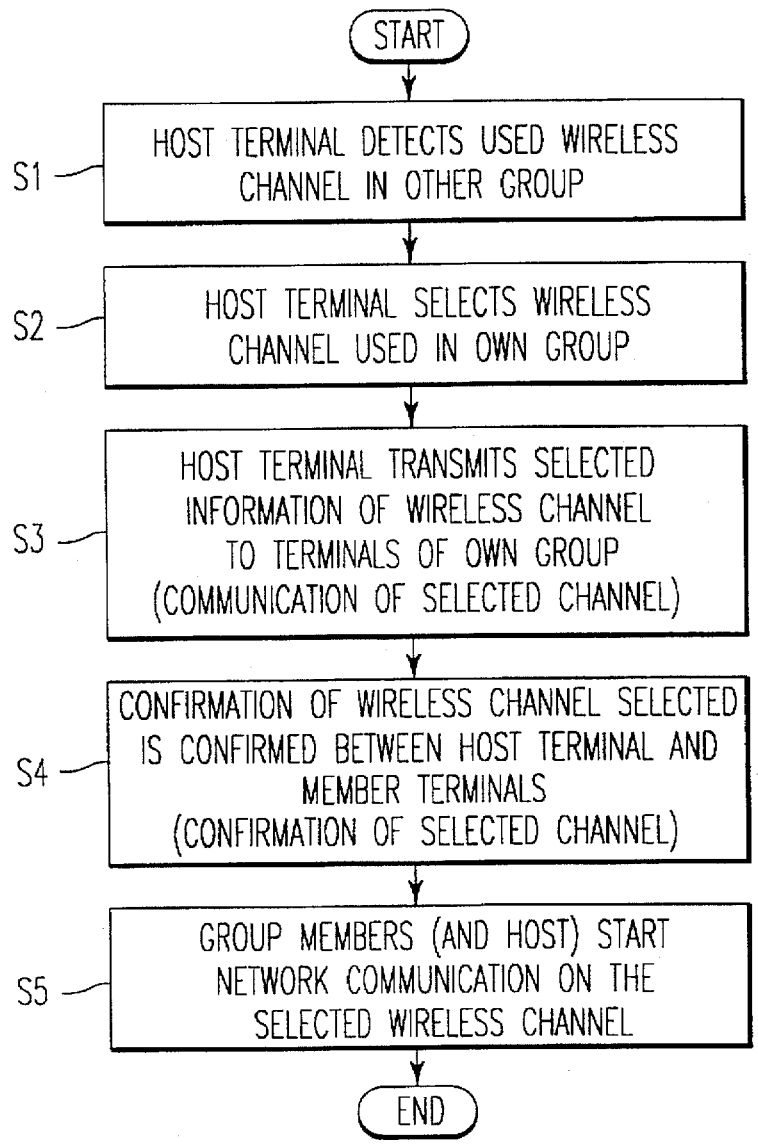

WIRELESS COMPUTER NETWORK COMMUNICATION SYSTEM AND METHOD HAVING AT LEAST TWO GROUPS OF WIRELESS TERMINALS

BACKGROUND OF THE INVENTION

1. Field of the Invention

The present invention relates to a computer network communication system utilizing wireless communication. The invention more particularly relates to a wireless computer network in which plural groups can perform network communication through different channels at the same time. For example, the above network communication system can be applied to an indoor or mobile wireless communication system.

2. Description of the Related Art

FIGS. 9 and 10 illustrate conventional wireless local area networks. FIG. 9 shows a system in which two groups of wireless terminals, respectively including terminals 41a–41d and 42a–42d, perform CSMA (Carrier Sense Multiple Access) by use of a single wireless channel A designated by 43. Carrier Sense Multiple Access systems sense whether a carrier is present (exists) or is absent (nonexistent) and if the carrier is present, the other terminals (the terminals which are not generating this carrier) do not transmit. This system is an example of a mutually constructed communication network. In order to operate the two groups on the single channel, discrimination data such as a group ID is included in the packet signal data transmitted from the wireless terminals 41a–41d and 42a–42d. However, regarding the transmitted signal itself, since the same wireless channel 43 is employed, if the number of groups using the channel is large, the total number of the wireless terminals increases along with the communication traffic. Consequently, the throughput of communication in the group is lowered with an increase in groups, as illustrated in FIG. 11. Such conventional problems are the subject matters to be solved by the present invention.

FIG. 10 illustrates a conventional wireless network in which each group includes a base station (45 or 47) which controls the wireless channel of the group. The base stations of the respective groups mutually perform confirmation such that the different groups do not use same wireless channel in such manner that the communication network is constructed by controlling the channel. Since plural wireless channels 48 and 49 are employed, the lowering of the communication throughput accompanying the increase of the groups number can be suppressed. However, it is absolutely necessary to provide the base stations 45 and 47 in the group and it is further necessary to mutually exchange in a complicated manner information regarding channel allocation between the base stations. Thereby, there arises a problem of positional restriction of performing communication only in the area where the base station is disposed. This conventional system is not suitable for realizing a mobile network in which the wireless terminals 44a–44c and 46a–46c are taken to optional places to perform network communication.

As to known publications describing conventional network communication systems, there exists, for example, Japanese Laid-open Patent Publication No. 6-29981/1994. This publication discloses a local area network (LAN) for receiving signals on a wireless transmission channel. The local area network includes a receiver and a transmitter. In order to realize a LAN with high efficiency, the LAN also includes a received signal level determining apparatus, a threshold level circuit apparatus for generating a level indication signal, and a controller for controlling the operation of the transmitter in accordance with the level indication signal.

Japanese Laid-open Patent Publication No. 5-260051/1993 proposes a wireless system capable of causing the base station to take a role of repeater and smoothly performing the operations of transmitting and receiving signals between the respective terminals by dividing the usable frequency zone into three areas including a message channel, a channel tone Up, and a channel tone Down. The network includes plural wireless terminals and a base station capable of performing the operation of transmitting and receiving the signal between the base station and all of the wireless terminals. This wireless system does not need communication cables connecting each of the terminals.

The wireless LAN described in the specification of Japanese Laid-open Patent Publication No. 6-29961/1994 utilizes the access system (CSMA) in the same manner as used in the popular Ethernet system; that is the wireless LAN of the symmetrical type jointly occupying the same wireless channel at all of the respective terminals. Furthermore, the wireless LAN described in the specification of Japanese Laid-open Patent Publication No. 5-260051/1993 is the wireless LAN with a base station which controls the wireless channel in order to improve the communication throughput.

In recent years, the number of notebook type portable personal computers (PCs) has increased. Furthermore, assuming that the palm-top computer, often called a portable information terminal or data assistant, starts to be used, users of these portable computers will go out from different or the same places and meet together carrying their portable computers and utilize the wireless network regardless of the place where they ordinarily work. In this situation, an environment in which communication can be performed properly is needed. The above-described network including portable computers is referred to as a mobile network.

It seems that there exist many environments in which the above mobile network is adjacently employed for each group of plural users. Further, on many occasions, the frequency of transmitting and receiving the required data in real time such as meeting increases, and thereby the traffic is raised. Consequently, in the wireless LAN as described in the specification of the above Japanese Laid-open Patent Publication No. 5-29961/1993 in which only one wireless channel is used (jointly occupied) by all of the respective terminals, there arises apparently a problem of causing a decrease in throughput.

Furthermore, in the wireless LAN as described in the specification of the above Japanese Laid-open Patent Publication No. 5-260051/1993, since it is necessary to provide a repeater such as the base station, the restriction of the place that the network can be constructed only at the place where the base station is installed arises inevitably.

SUMMARY OF THE INVENTION

Accordingly, it is an object of the present invention to solve the above-mentioned problems.

It is another object of the present invention to provide a communication system and method in which a plurality of groups perform network communication at the same time by the use of different wireless channels by preparing plural wireless channels with very small interference and by selecting one wireless channel at the time of constructing the network based on other channels used by other groups.

These and other objects are accomplished by a novel wireless communication network in which groups optionally constructed (ad-hoc) with the plural wireless terminals perform symmetrical type network communication between the respective wireless terminals belonging to a same group. The network communication system is constructed such that when a group performs network communication, any one of the wireless terminals belonging to the group detects the communication channel being employed in one or more other groups, determines the vacant (unused) communication channels, and selects the vacant communication channel to be employed by the above group. Thereafter, the communication channel thus selected is notified at least to the other wireless terminals belonging to the group. After the other wireless terminals confirm the communication channel to be employed by the group members, the symmetrical type network communication is started and uses the above communication channel.

In an embodiment, the communication channel selected for the group is code-divisionally multiplied by the PN (pseudonoise) code individually selected (employed) for the groups. Communication in the same group detects the presence or absence of the spread-spectrum signal of the aforementioned individual PN code, and when the spread-spectrum signal is not detected, the transmitting operation is done.

Therefore, it is possible to provide a wireless system which uses a carrier of a single frequency as the carrier to be employed for transmission, and plural wireless communication groups can coexist with small interference.

As another alternative, the communication channel employed in the groups may be frequency-divisionally multiplied by the frequency individually selected for the respective groups. The communication performed by a group detects the presence or absence of the signal in the aforementioned individual frequency, and when the signal is not detected, the transmitting operation is done.

Consequently, it is possible to provide a wireless system in which by allocating the carriers of plural different frequencies to the respective wireless channels, plural wireless communication groups can coexist with very small interference.

With the present invention, it is possible to provide a wireless system in which the plural groups can perform network communication at the same time using different wireless channels, and in the wireless system thus realized, lowering of the throughput can be suppressed. Furthermore, the network environment can be freely constructed regardless of the place where the network is installed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a flowchart showing a communication procedure performed when network communication using the terminal illustrated in FIG. 2;

FIG. 4 is a graph showing the relationship between the communication throughput among the members in a group and the number of the groups according to the present invention;

DESCRIPTION OF THE PREFERRED EMBODIMENTS

Figure 1:
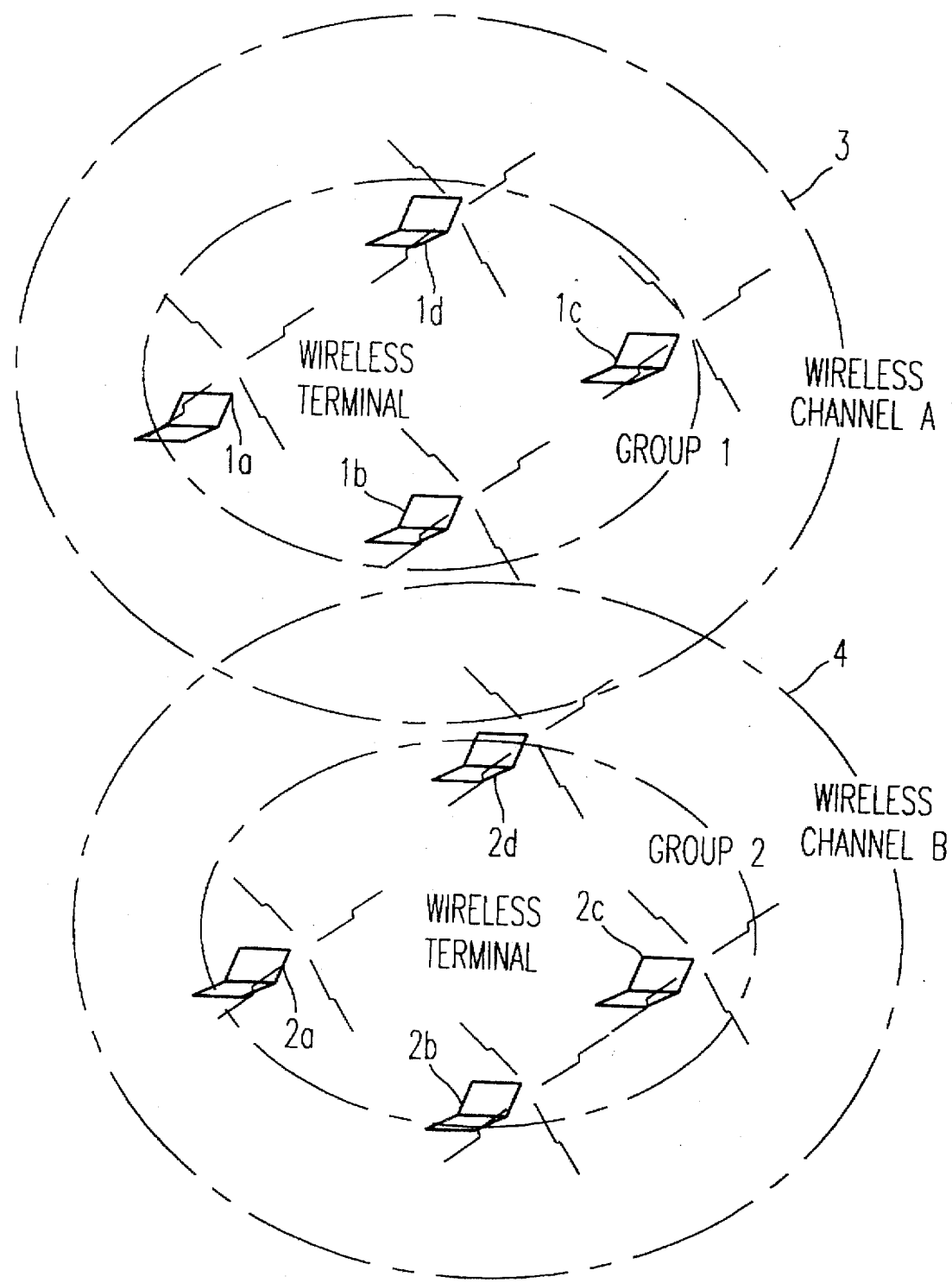
FIG. 1 is a diagram of a network communication system according to the present invention.

Referring now to the drawings wherein like reference numbers designate identical or corresponding parts throughout the several views and more particularly to FIG. 1 thereof, there is illustrated a block diagram of a network communication system which is a wireless local area network. There is a first group of wireless terminals 1a–1d, a second group of wireless terminals 2a–2c, a wireless channel A designated by 3, and another wireless channel B designated by 4. The first group of wireless terminals 1a–1d and the second group of wireless terminals 2a–2d making up terminal groups one and two, respectively, and are not in the relationship of a base station and terminal stations, but those terminal groups construct a symmetrical type of network when communicating. A symmetrical type network is a type of Local Area Network which does not have a base station and all terminals communicating on the network have equal responsibilities for controlling communication. This may mean that each terminal only controls its own communication once the network is set up. A base station is a terminal which controls the other terminals of the group.

The terminal groups 1 and 2 including the plural wireless terminals 1a–1d and 2a–2d perform symmetrical type network communication between the respective wireless terminals belonging to the respective groups. When a group, for example group 1, performs network communication, any one of the wireless terminals 1a–1d belonging to the group 1 (called a host) detects the communication channel B being employed in the other group (group 2) and judges the vacant (unused) channel. The host terminal is not a base station but its function is simply to select a vacant channel. After the channel is selected, the host terminal does not need to perform any control over other terminals. After selecting the communication channel A as the communication channel to be employed in the present group (group 1), the selected communication channel is notified to at least the other wireless terminals belonging to the same group. At this time, the other wireless terminals confirm the communication channel to be employed in the group 1, and thereafter the terminals start the symmetrical type network communication by use of the above communication channel.

Figure 2:
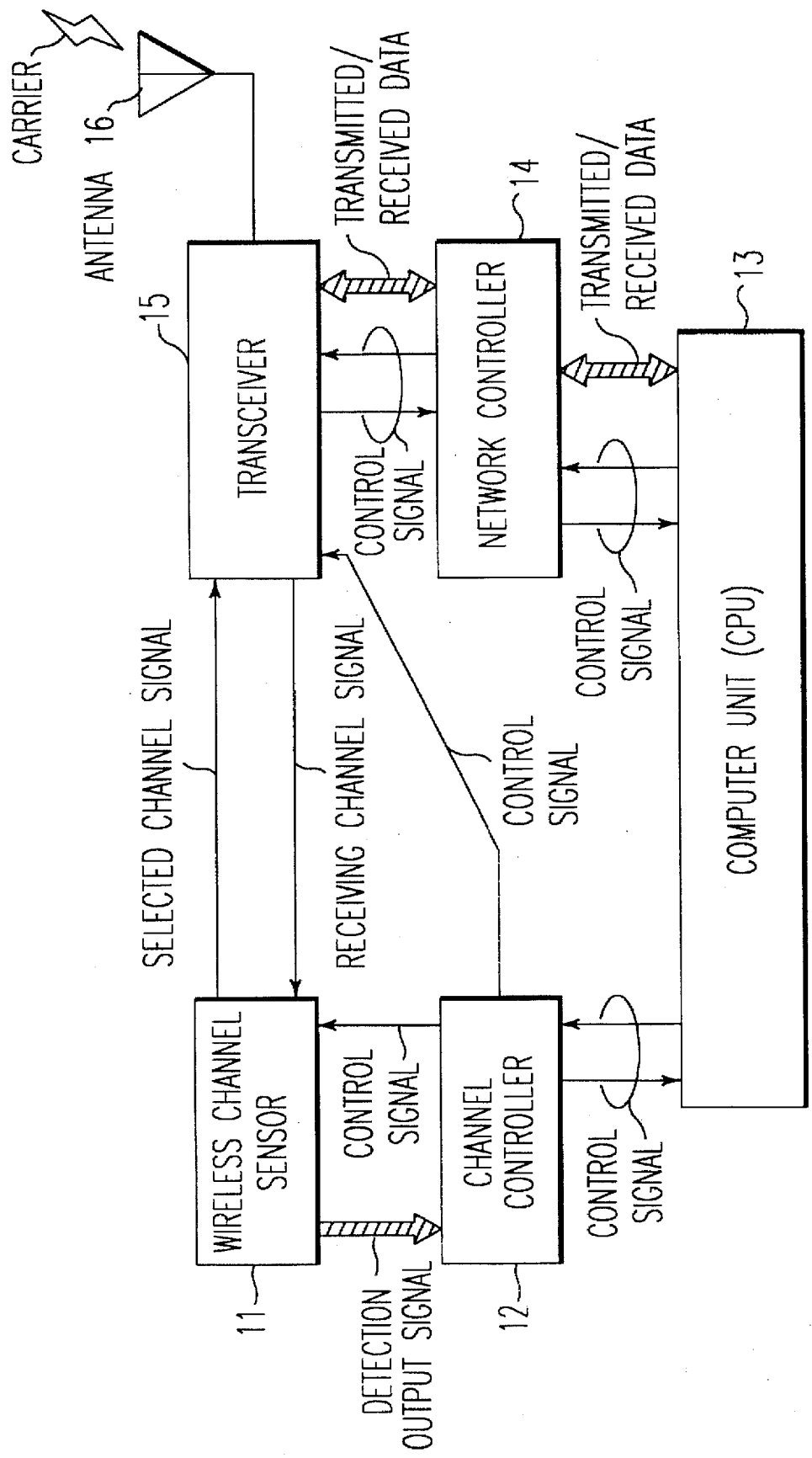
FIG. 2 is a block diagram for explaining an embodiment of a wireless terminal employed by a wireless local area network (LAN) according to the present invention.

FIG. 2 is a block diagram representing each wireless terminal illustrated in FIG. 1. Each terminal includes a wireless channel sensor 11 for detecting the presence or absence of the wireless channel being employed among the plural wireless channels, a channel controller 12 for selecting the wireless channel, a computer or microprocessor 13 for requiring and issuing the requirements of the transceiver 15 which transmits and receives over plural wireless channels, a network controller 14 for performing symmetrical type network communication, and an antenna 16.

The channel controller 12 receives an instruction to start the network communication from the computer 13, controls the wireless channel sensor 11, and starts the operation of detecting the receiver signal. The wireless channel sensor 11 detects the received signal through the transceiver 15, and detects the wireless channel employed for the received signal and as a result thereof output a detection output signal. The detection output signal is input by the channel controller 12 which determines the wireless channel for the transceiver 15, and controls the transceiver 15 so as to employ the determined channel. The channel controller 12 also notifies the computer 13 through control signals that the start of the network communication has been already prepared and thereafter the computer 13 starts the network communication through the network controller 14. The network controller 14 for instance is a CSMA/CA (Collision Avoidance) network control LSI and transmits and receives data between the transceiver 15 and the computer 13.

While the embodiment in FIG. 2 utilizes an antenna, the wireless communication can be performed using electromagnetic radio waves, light rays such as infrared light rays, or audio such as ultrasonic audio.

An example of the operation of the invention will now be provided for a mobile or portable wireless network. The mobile network may be utilized with a group participating in a conference or meeting, for example. One of the members participating in the communication takes a role of a host. The wireless terminal occupied by the host at the time of starting the conference by use of the mobile network is called the "host terminal". This "host terminal" is any one of the wireless terminals in the group and it is not always necessary for this particular host terminal to take the role of the host.

FIG. 3 is a flowchart showing the communication procedure performed when starting network communication using the terminal illustrated in FIG. 2. At first, the host terminal detects the wireless channel being used in other groups(s) (S1). The host terminal selects one wireless channel not being used as the wireless channel to be used in the group using its channel sensing function (S2).

Next, the host terminal transmits (notifies) the information data of the selected wireless channel to the respective members in the group (S3). The respective members confirm the wireless channel to be used in the group in accordance with the signal transmitted from the host terminal (S4). After the above-mentioned procedure, for instance, the symmetrical type network communication with CSMA is performed by use of the wireless channel selected in the group (S5).

It is possible to reduce the mutual interference between the plural groups by selecting the wireless channel with small correlation. Consequently, by employing the different wireless channels for each group, the throughput of the communication within the group can be improved against utilizing the CSMA communication by use of the single channel, as shown in FIG. 4. FIG. 4 illustrates that communication throughput remains fairly constant as the number of groups is increased.

The above-described embodiment makes it possible to provide a wireless computer network for performing plural ad-hoc network communication at the same time with different wireless channels.

The network communication system according to the above-described embodiment requires the preparation of plural small-correlation wireless channels. In the network communication system according to the second embodiment described with respect to FIG. 5, plural codes (pseudonoise) are used as the wireless channel in the system of the first embodiment.

Figure 5:
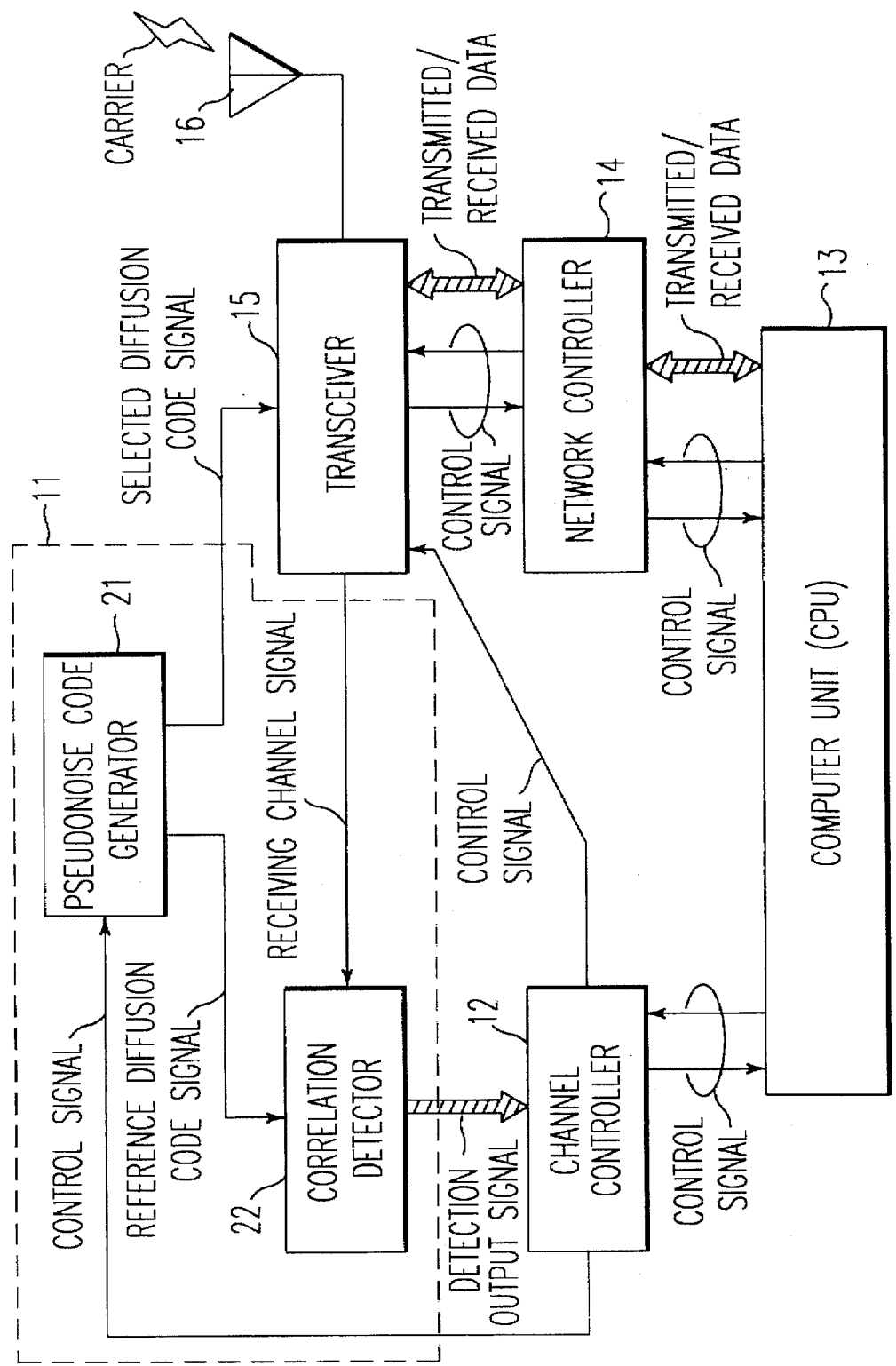
FIG. 5 is a block diagram for explaining another embodiment of the wireless terminal employed by the wireless LAN according to the present invention.

FIG. 5 is a block diagram of a wireless terminal for use in the wireless LAN according to the second embodiment of the present invention. In FIG. 5, the wireless channel sensor 11 includes a pseudonoise (PN) code generator 21, and a correlation detector 22. A description of the elements in FIG. 5 which are the same as the elements illustrated in FIG. 2 are omitted for brevity. The PN code generator 21 generates plural PN codes previously prepared. Concerning those PN codes, for instance, the period signal such as the maximum-length sequence signal is employed. As the PN codes, the codes in which the mutual correlation thereof turns out to be as small as possible are selected, for instance, just like the preferred pair of the maximum-length sequence signal. At the transceiver, the data signal to be transmitted is multiplied by one of the PN codes, and thereafter it is transmitted. The correlation detector 22 has a correlation circuit for calculating the correlation between the PN code outputted from the above-mentioned PN code generator 21 and the received signal.

In the correlation detector 22, the PN code used as the wireless channel is detected by calculating the degree (extent) of the correlation between the signal received by the transceiver 15 and the reference signal generated by the PN code generator 21 through the use of the correlation circuit. As an example, the correlation circuit is constructed with a multiplier and a low-pass filter when the received signal is a base-band signal, and the same is constructed with a mixer, a band-pass filter, and an envelope detector when the received signal is a RF signal or an intermediate frequency signal.

Furthermore, there is a method of employing a synchronous circuit such as a DLL (Delay Lock Loop). The correlation detector 22 can be constructed with a matching filter regarding the respective PN codes prepared respectively. As to the above-mentioned methods, it is permitted to adopt any method of obtaining the output of the correlation calculator by use of either one of an analog circuit or a digital circuit.

The channel controller 12 changes over the type of the reference pseudonoise code signal generated by the pseudonoise code generator 21 and receives the correlation output signal between the received signals regarding the respective codes as the output from the correlation detector 22. When the correlation output signal is below a predetermined threshold value, it is judged that the PN code can be used.

Furthermore, the PN code generator 21 is controlled such that the selected PN code signal is supplied to the transceiver 15, and the transceiver 15 is further controlled in order to transmit and receive through the use of the code. Owing to the above functions, the PN code unused is selected by the host terminal as the code used in the wireless channel of the group.

Figure 6:
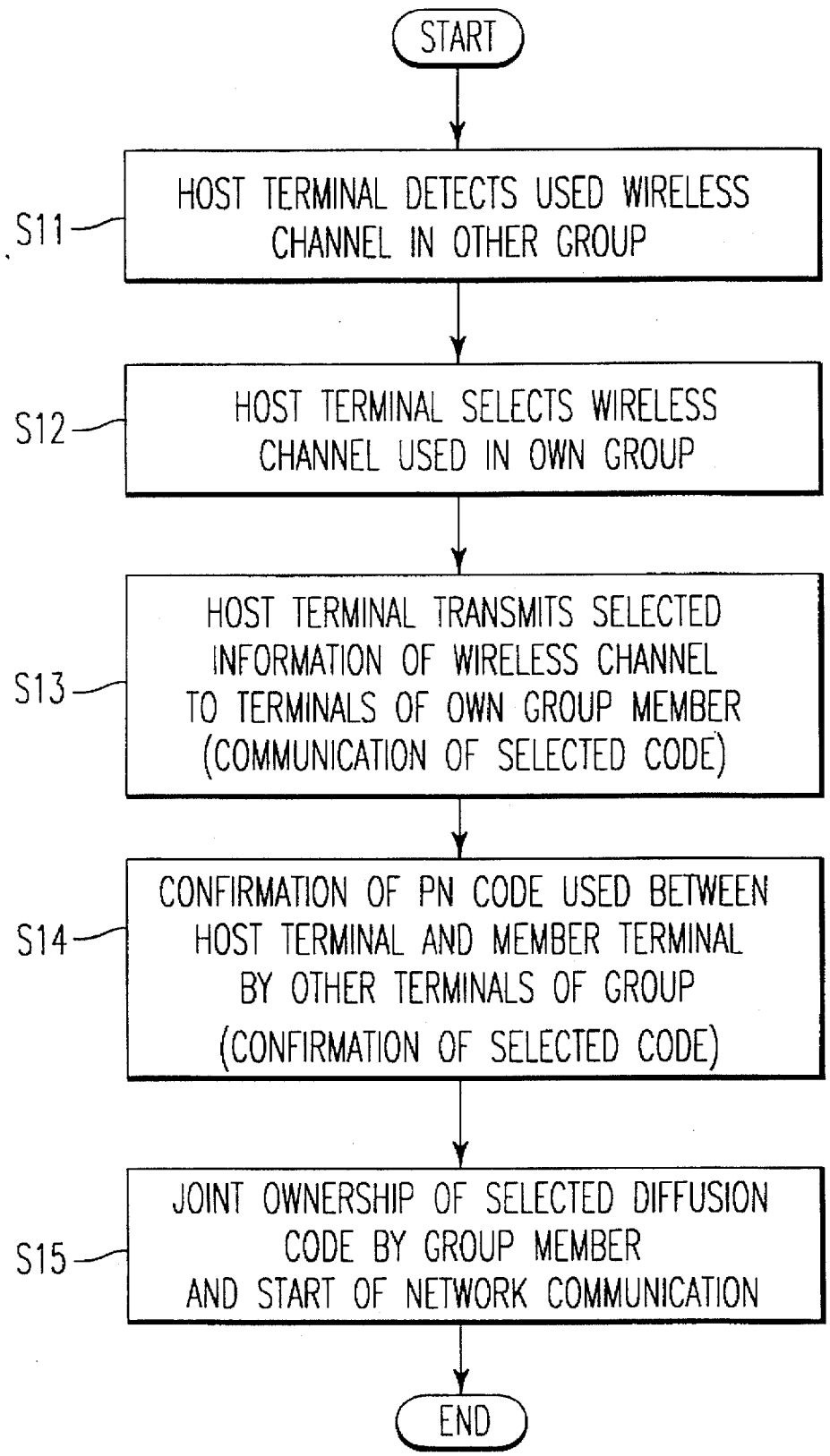
FIG. 6 is a flowchart showing a communication procedure for setting up a network using the terminal illustrated in FIG. 5.

FIG. 6 is a flowchart showing the communication procedure for forming the network using the terminal illustrated in FIG. 5. First, the host terminal detects the PN code(s) being used as the wireless channel by another group(s) (S11). The host terminal next selects one of the PN codes not used by the other group(s), assigns this PN code for use by its own group (S12) and transmits this information to other terminals of its own group (S13). The PN code to be employed in the group is then confirmed by the members of the group (S14).

After performing the above procedure, the transmitting data is multiplied by the selected PN code at the respective terminals and the same is modulated with a carrier and thereafter transmitted. For instance, the symmetrical type network communication is performed by use of CSMA (S15). However, at this time, contrary to the conventional CSMA (Carrier Sense Multiple Access), the wireless terminal does not detect the presence or absence of the carrier itself but the selected PN code selected in the group (namely, Code Sense Multiple Access). The wireless terminal transmits the data when the selected code is absent. In Code Sense Multiple Access communication, if the carrier is present but the code(s) of or relating to (modulating) the carrier is different from the code to be used by the terminal, the terminal is permitted to transmit. However, if a carrier exists but the code is the same to be used by the terminal, then the terminal will not transmit.

The second embodiment described above makes it possible to provide a wireless system based on the first embodiment which is provided with a plural code-divided wireless channel employing the carrier of sole (single) frequency as the carrier to be used for the transmission with small interference.

Figure 7:
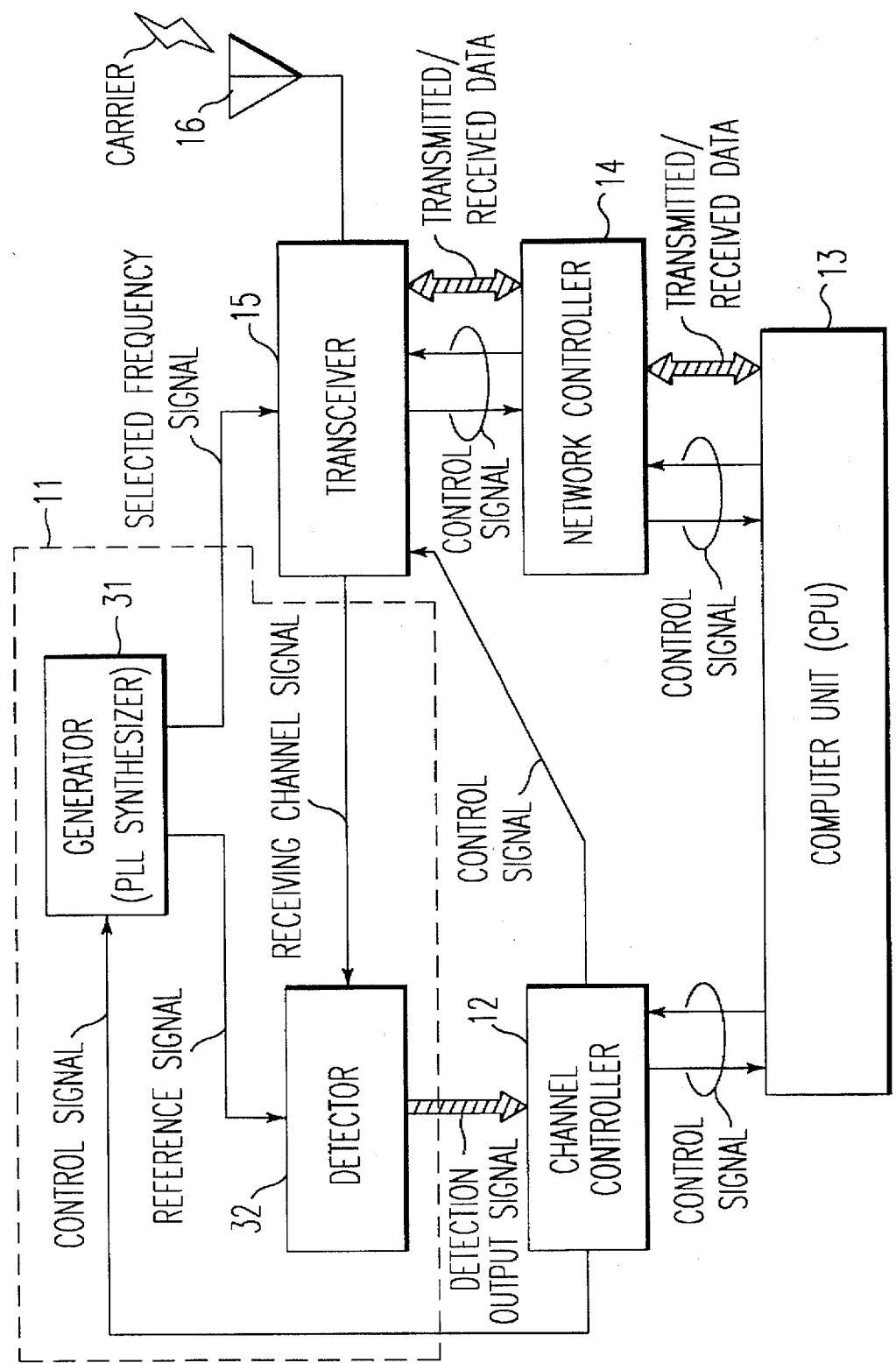
FIG. 7 is a block diagram for explaining still another embodiment of the wireless terminal employed by the wireless LAN according to the present invention.

The third embodiment of the invention relates to employing plural frequency-divided wireless channels in the network system described in the first embodiment. FIG. 7 is a block diagram of the wireless terminal for use in the wireless LAN according to the third embodiment. In FIG. 7, the wireless channel sensor includes a phase-locked loop (PLL) synthesizer 31 which functions as a signal generator, and a detector 32. The wireless terminals 1a–1d and 2a–2d each have a signal generator 31 for generating predetermined plural different frequencies. Since sine waves of different frequencies are orthogonal to each other, it is possible to select the wireless channels of different frequencies so as to make the mutual correlation small by a sufficiently wide frequency interval. The transceiver 15 selects one frequency from among the prepared frequencies as the carrier. It is preferably to have the influence between channels small and the mutual correlation indicates the strength of influence of the channels over each other. In the frequency divided multiple access system, small mutual correlation results when the intervals between frequencies are broad.

The detector 32 calculates the correlation between the reference signal (e.g., signal containing the PN code generated by the PN generator) and the received signal. The wireless channel sensor 11 detects the frequency of the wireless channel being employed. The detector 32 includes a mixer, a band-pass filter or plural band-pass filters corresponding to the respective frequencies, and an envelope detector. Any desired method of calculating the correlation between the received carrier signal and the reference signal may be employed. Further, the desired functions can be performed through the use of digital signal processing as opposed to individual circuit elements.

The channel controller 12 which selects the wireless channel judges that the frequency can be used when the output of the detector 32 is below a predetermined threshold value. In this process, the frequency to be employed is determined, and thereby the signal generator 31 is controlled to supply the signal of the selected frequency to the transceiver 15. Owing to these functions, the wireless channel of an unused frequency is selected by the host terminal.

Figure 8:
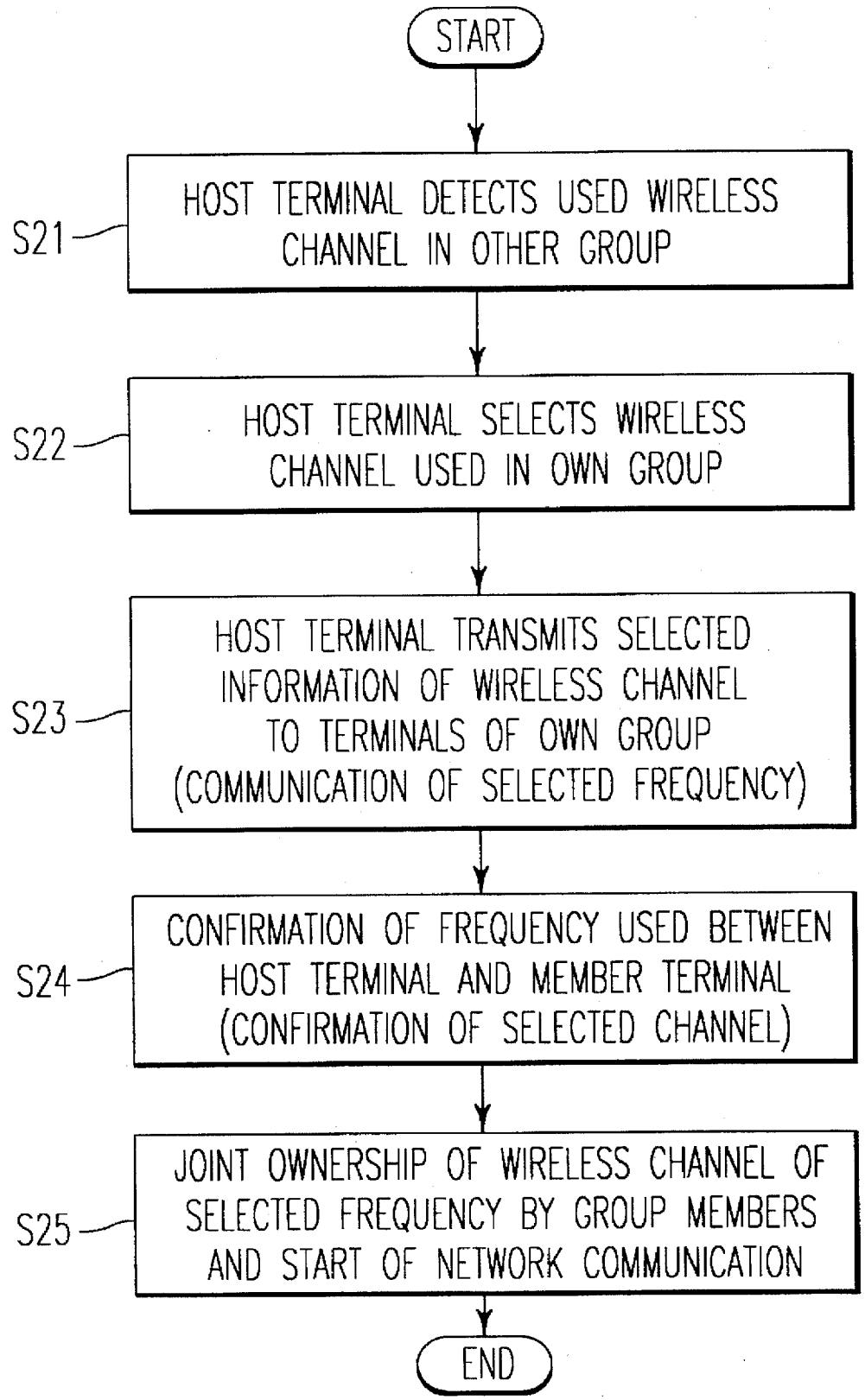
FIG. 8 is a flowchart showing a communication procedure for setting up a network using the terminal illustrated in FIG. 7.
Figure 9:
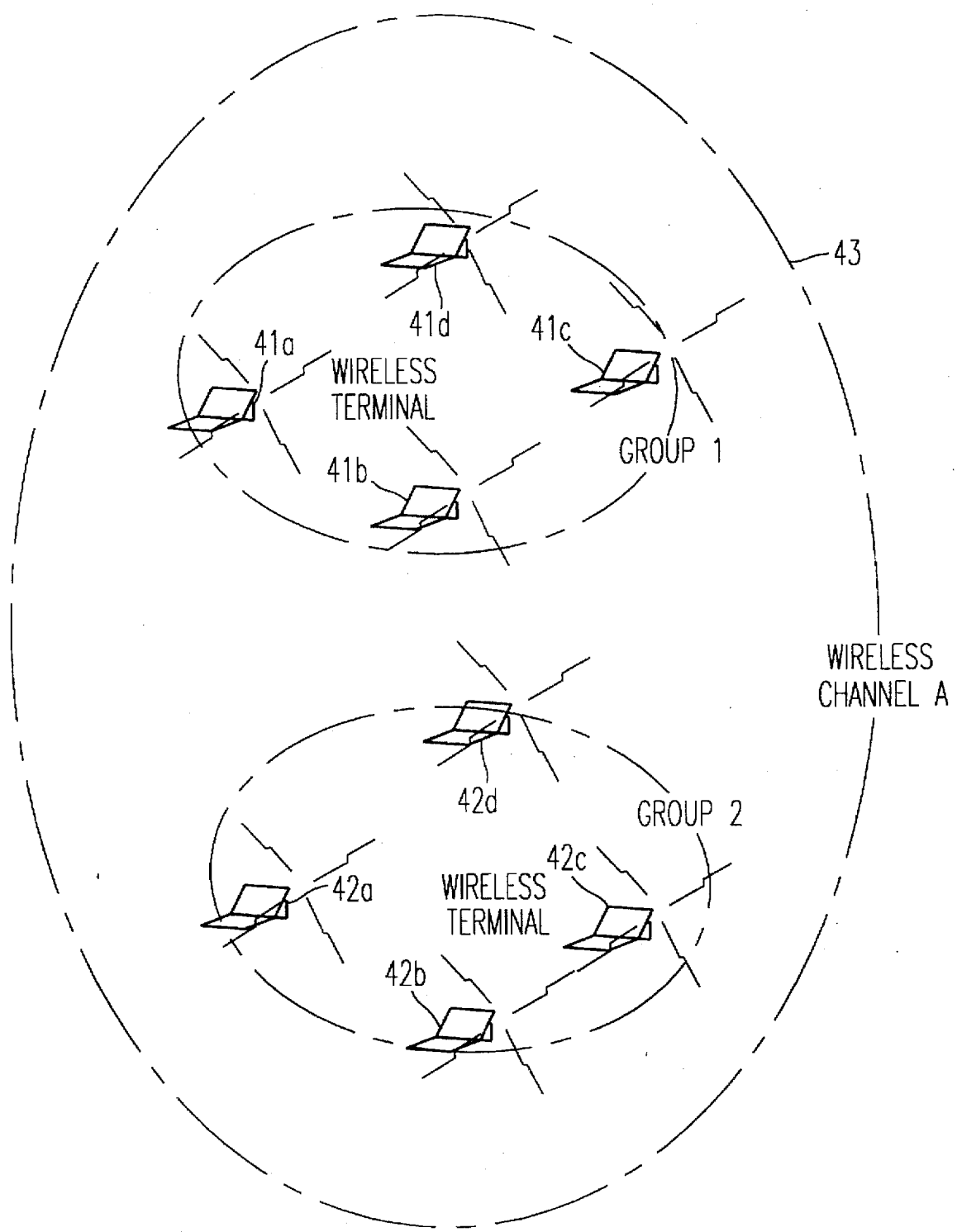
FIG. 9 is a diagram of a first type of conventional local area network (LAN)
Figure 10:
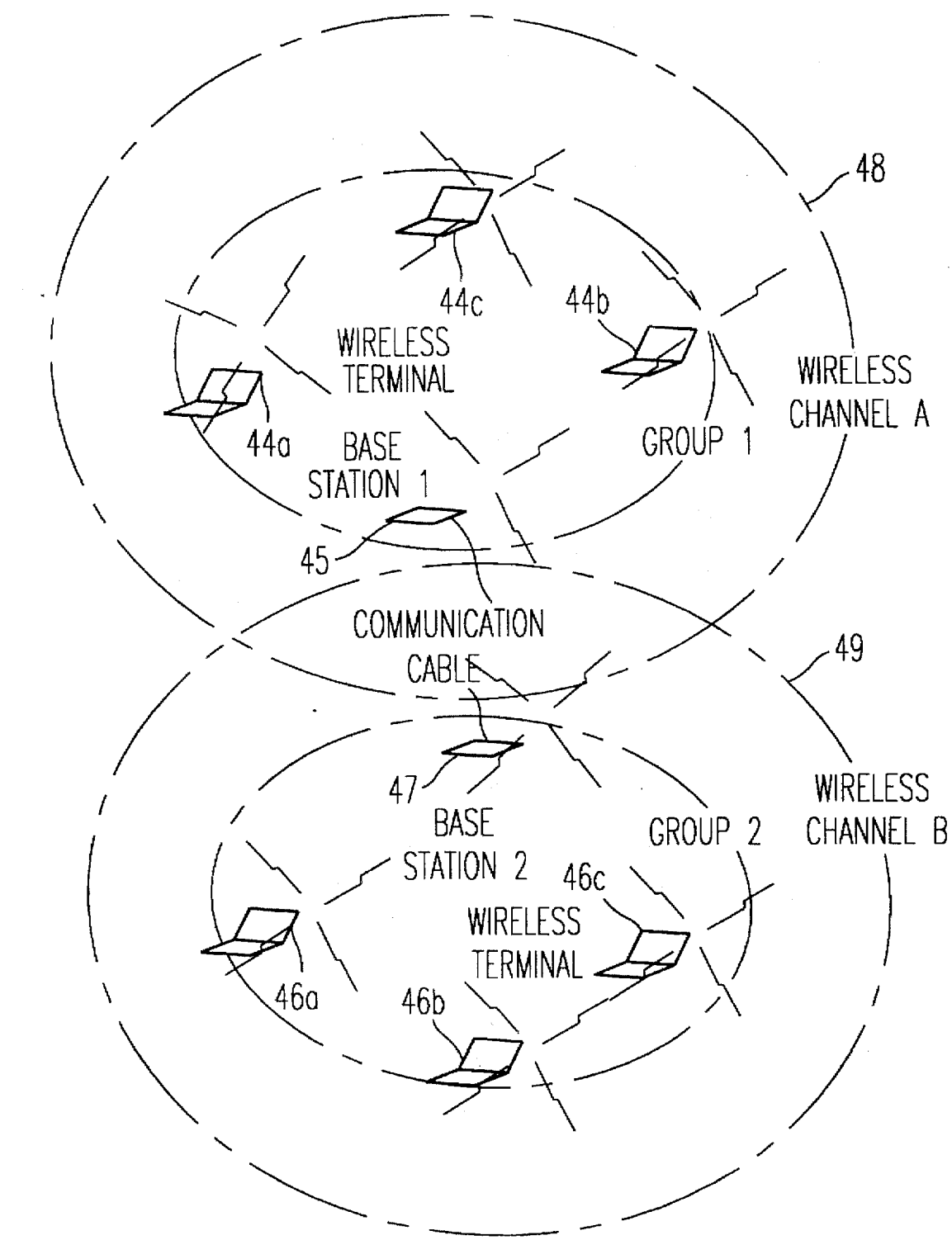
FIG. 10 is a diagram of a second type of conventional local area network (LAN)
Figure 11:
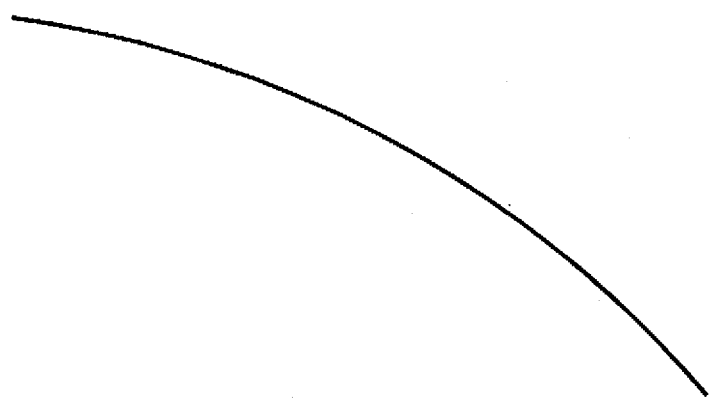
FIG. 11 is a graph showing the relationship between the communication throughput among the members in a group and the number of groups.

FIG. 8 is a flowchart showing the communication procedure for setting up a network using communication terminals as illustrated in FIG. 7. At first, the host terminal detects the frequency of the wireless channel being employed by one or more other groups (S21). One of the unused frequencies is selected as the frequency of the wireless channel to be employed (S22). Next, the host terminal transmits (notifies) the selected frequency to the members of the group (S23). The respective members confirm the frequency to be employed by the group (S24). After this procedure, in the group the selected carrier is modulated by the data to be transmitted and subsequently transmitted. For instance, symmetrical type network communication with CSMA is performed (S25).

The third embodiment described above makes it possible to provide a wireless system based on the first embodiment which is provided with plural frequency-divided wireless channels with very small interference.

The present invention is used, for example, in an ad-hoc network, also referred to herein as a mobile network which allows plural users to go out from different or the same location and meet. During the meeting, the network is constructed (mutually) in order to perform symmetrical wireless communication. This differs from conventional wireless networks in which computers are stationed in a fairly static office environment.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters: Patent of the United States is:

1. A wireless network communication method using at least two groups of respective wireless terminals communicating on separate communication channels which correspond to the groups, comprising the steps of:

communicating on a first channel by a first group of the wireless terminals;

determining a vacant channel by a terminal of a second group of the wireless terminals;

selecting the vacant channel and notifying other terminals of the second group of the selection, by said terminal;

acknowledging the selected channel by the other terminals; and communicating on the selected channel by the second group of terminals, wherein said step of communicating on the selected channel by the second group of terminals is performed such that each of the terminals of the second group have equal control over the communication channel, and wherein said step of communicating on the selected channel by the second group of terminals is performed without the use of a base station which controls the communicating by the second group.

2. A wireless network communication method according to claim 1, wherein:

said step of communicating on the selected channel by the second group of terminals includes symmetrically communicating.

3. A wireless network communication method using at least two groups of respective wireless terminals communicating on separate communication channels which correspond to the groups, comprising the steps of:

communicating on a first channel by a first group of the wireless terminals;

determining a vacant channel by a terminal of a second group of the wireless terminals;

selecting the vacant channel and notifying other terminals of the second group of the selection, by said terminal;

acknowledging the selected channel by the other terminals; and communicating on the selected channel by the second group of terminals, wherein said step of communicating on the selected channel by the second group of terminals includes:

detecting, by one of said terminals of the second group, that a predetermined code for a carrier is not present; and transmitting, by said one of said terminals, information when said one of said terminals of the second group detects that the predetermined code for the carrier is not present.

4. A wireless network communication method according to claim 3, wherein:

said step of detecting by one of said terminals of the second group that a predetermined code for a carrier is not present detects that the carrier is present and that the code for the carrier is not present; and said step of transmitting by said one of said terminals is performed when the carrier is present and the code for the carrier is not present.

5. A wireless network communication method using at least two groups of respective wireless terminals communicating on separate communication channels which correspond to the groups, comprising the steps of:

communicating on a first channel by a first group of the wireless terminals;

determining a vacant channel by a terminal of a second group of the wireless terminals;

selecting the vacant channel and notifying other terminals of the second group of the selection, by said terminal;

acknowledging the selected channel by the other terminals; and communicating on the selected channel by the second group of terminals, wherein:

the selecting and notifying step selects a pseudonoise (PN) code for the vacant channel and notifies the other terminals of the second group of the selected PN code; and said step of communicating on the selected channel by the second group of terminals initiates communication when a spread-spectrum signal having the selected PN code is not detected.

6. A wireless network communication method using at least two groups of respective wireless terminals communicating on separate communication channels which correspond to the groups, comprising the steps of:

communicating on a first channel by a first group of the wireless terminals, determining a vacant channel by a terminal of a second group of the wireless terminals;

selecting the vacant channel and notifying other terminals of the second group of the selection, by said terminal;

acknowledging the selected channel by the other terminals; and communicating on the selected channel by the second group of terminals, wherein:

said step of selecting and notifying includes selecting a frequency and notifying the other terminals of the second group of the selected frequency; and said step of communicating on the selected channel by the second group of terminals includes initiating communication when an absence of a signal on the selected frequency is detected and communication is performed on the selected channel by the second group of terminals by frequency-divisionally multiplying the selected frequency by information which is to be transmitted.

7. A terminal for use in a wireless network communication system, comprising:

a transceiver capable of utilizing different wireless channels;

a wireless channel sensor, connected to the transceiver, for detecting a received signal from the transceiver and for detecting the presence or absence of communication on the wireless channels;

a network controller, connected to the transceiver, for controlling transmitting and receiving requirements and data, and for controlling symmetrical type network communication in which each terminal of a group has equal control of communication within the group;

a channel controller, connected to the transceiver, for deciding the wireless channel to be employed in said transceiver, controlling said transceiver; and a processor for starting the network communication using said network controller.

8. A terminal according to claim 7, wherein said wireless channel sensor comprises:

a pseudonoise code generator for generating predetermined pseudonoise codes; and a correlator having a circuit for calculating a correlation between the pseudonoise codes generated by said pseudonoise code generator and a signal received by said transceiver.

9. A terminal according to claim 7, wherein said wireless channel sensor comprises:

a signal generator for generating predetermined frequencies; and a detector for outputting correlative values between a reference signal and the received signal using the predetermined frequencies generated by the signal generator.

10. A wireless network communication system using at least two groups of respective wireless terminals communicating on separate communication channels which correspond to the groups, comprising:

means for communicating on a first channel by a first group of the wireless terminals;

means for determining a vacant channel by a terminal of a second group of the wireless terminals;

means for selecting the vacant channel and notifying other terminals of the second group of the selection, by said terminal;

means for acknowledging the selected channel by the other terminals; and means for communicating on the selected channel by the second group of terminals, wherein said means for communicating on the selected channel by the second group of terminals operates such that each of the terminals of the second group have equal control over the communication channel, and wherein said means for communicating on the selected channel by the second group of terminals operates without the use of a base station which controls the communicating by the second group.

11. A wireless network communication system according to claim 10, wherein:
said means for communicating on the selected channel by the second group of terminals includes means for symmetrically communicating.

12. A wireless network communication system using at least two groups of respective wireless terminals communicating on separate communication channels which correspond to the groups, comprising:
means for communicating on a first channel by a first group of the wireless terminals;
means for determining a vacant channel by a terminal of a second group of the wireless terminals;
means for selecting the vacant channel and notifying other terminals of the second group of the selection, by said terminal;
means for acknowledging the selected channel by the other terminals; and
means for communicating on the selected channel by the second group of terminals,
wherein said means for communicating on the selected channel by the second group of terminals includes:
means for detecting, by one of said terminals of the second group, that a predetermined code for a carrier is not present; and
means for transmitting, by said one of said terminals, information when said one of said terminals of the second group detects that the predetermined code for the carrier is not present.

13. A wireless network communication system according to claim 12, wherein:
said means for detecting by one of said terminals of the second group that a predetermined code for a carrier is not present detects that the carrier is present and that the code for the carrier is not present; and
said means for transmitting by said one of said terminals operates when the carrier is present and the code for the carrier is not present.

14. A wireless network communication system using at least two groups of respective wireless terminals communicating on separate communication channels which correspond to the groups, comprising:
means for communicating on a first channel by a first group of the wireless terminals;
means for determining a vacant channel by a terminal of a second group of the wireless terminals;
means for selecting the vacant channel and notifying other terminals of the second group of the selection, by said terminal;
means for acknowledging the selected channel by the other terminals; and
means for communicating on the selected channel by the second group of terminals,
wherein:
the selecting and notifying means selects a pseudonoise (PN) code for the vacant channel and notifies the other terminals of the second group of the selected PN code; and
said means for communicating on the selected channel by the second group of terminals initiates communication when a spread-spectrum signal having the selected PN code is not detected.

15. A wireless network communication system using at least two groups of respective wireless terminals communicating on separate communication channels which correspond to the groups, comprising:
means for communicating on a first channel by a first group of the wireless terminals;
means for determining a vacant channel by a terminal of a second group of the wireless terminals;
means for selecting the vacant channel and notifying other terminals of the second croup of the selection, by said terminal;
means for acknowledging the selected channel by the other terminals; and
means for communicating on the selected channel by the second group of terminals,
wherein:
said means for selecting and notifying includes selecting a frequency and notifying the other terminals of the second group of the selected frequency; and
said means for communicating on the selected channel by the second group of terminals includes means for initiating communication when an absence of a signal on the selected frequency is detected and communication is performed on the selected channel by the second group of terminals by frequency-divisionally multiplying the selected frequency by information which is to be transmitted.

* * * * *